(12) United States Patent
Estes et al.

(10) Patent No.: US 8,788,557 B2
(45) Date of Patent: Jul. 22, 2014

(54) BI-PHASIC APPLICATIONS OF REAL AND IMAGINARY SEPARATION, AND REINTEGRATION IN THE TIME DOMAIN

(71) Applicant: Innersense, Inc., Santa Monica, CA (US)

(72) Inventors: Don Wayne Estes, Santa Monica, CA (US); Randall Joseph Stack, Baltonsborough (GB)

(73) Assignee: Innersense, Inc., Santa Monica, CA (US)

( * ) Notice: Subject to any disclaimer, the term of this patent is extended or adjusted under 35 U.S.C. 154(b) by 0 days.

(21) Appl. No.: 13/910,399

(22) Filed: Jun. 5, 2013

(65) Prior Publication Data

US 2014/0164455 A1     Jun. 12, 2014

Related U.S. Application Data

(60) Provisional application No. 61/735,932, filed on Dec. 11, 2012.

(51) Int. Cl.
*G06F 17/14*     (2006.01)

(52) U.S. Cl.
CPC .................................... *G06F 17/14* (2013.01)
USPC .......................................... 708/400; 708/300

(58) Field of Classification Search
None
See application file for complete search history.

(56) References Cited

U.S. PATENT DOCUMENTS

| | | | |
|---|---|---|---|
| 5,331,222 A * | 7/1994 | Lin et al. | 327/554 |
| 5,617,344 A * | 4/1997 | Young et al. | 708/313 |
| 7,805,386 B2 * | 9/2010 | Greer | 706/12 |
| 2005/0276420 A1 * | 12/2005 | Davis | 381/20 |

* cited by examiner

*Primary Examiner* — Michael D Yaary
(74) *Attorney, Agent, or Firm* — Fish & Tsang LLP

(57) ABSTRACT

A signal is decomposed into different components using a transform, with the components then being separately presented to a person in a manner that produces a different cognitive experience than would have resulted from either (a) presentation of the original signal, or (b) presentation of a fully synthesized (inverse transformed) signal.

37 Claims, 11 Drawing Sheets

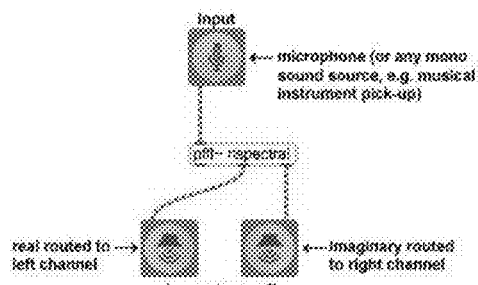
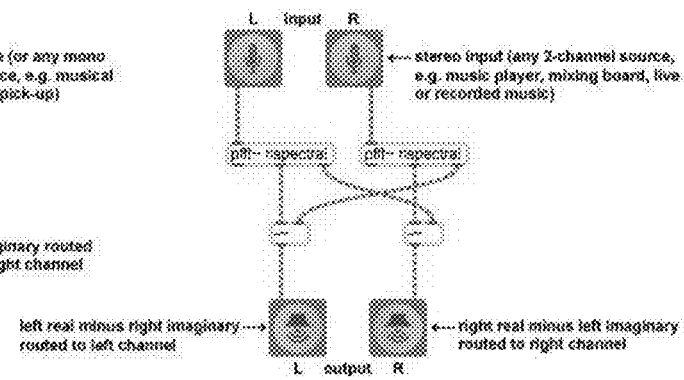
Figure 1                           Figure 2
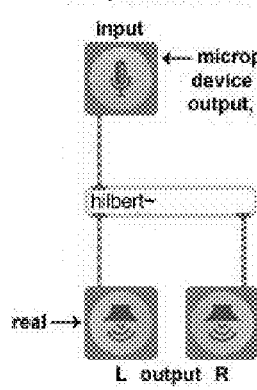
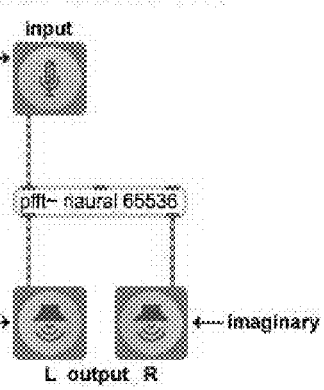
Figure 3

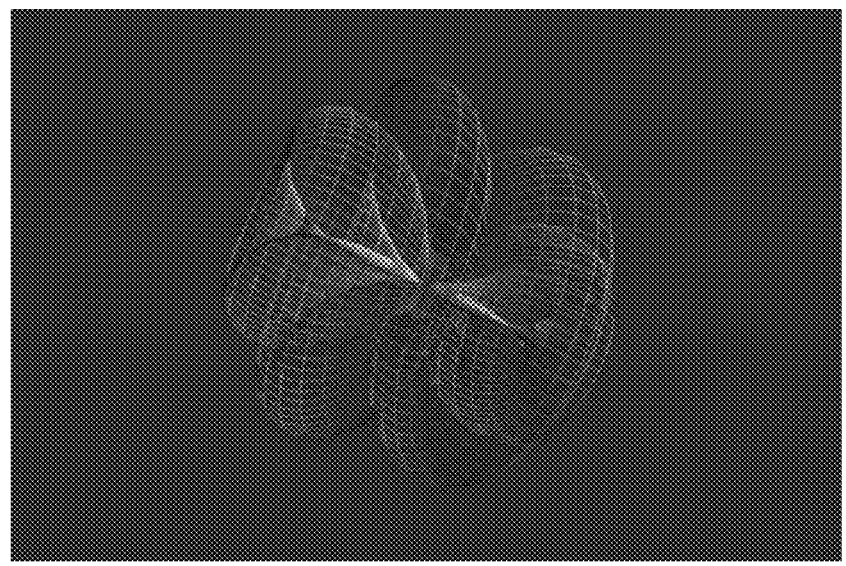
Figure 5C
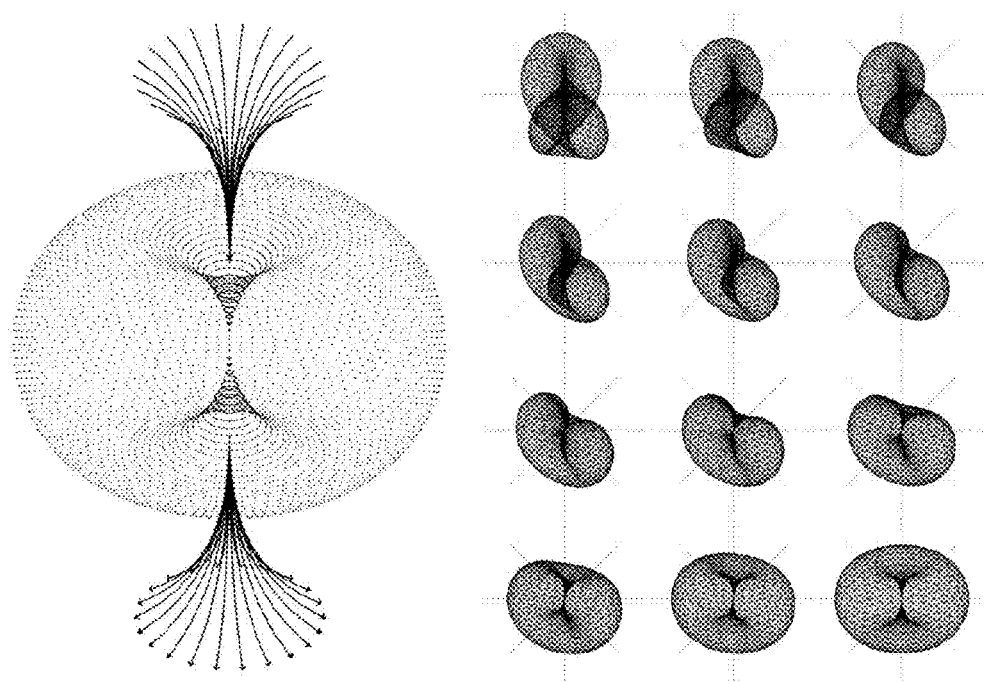
Figure 6A - Convolution

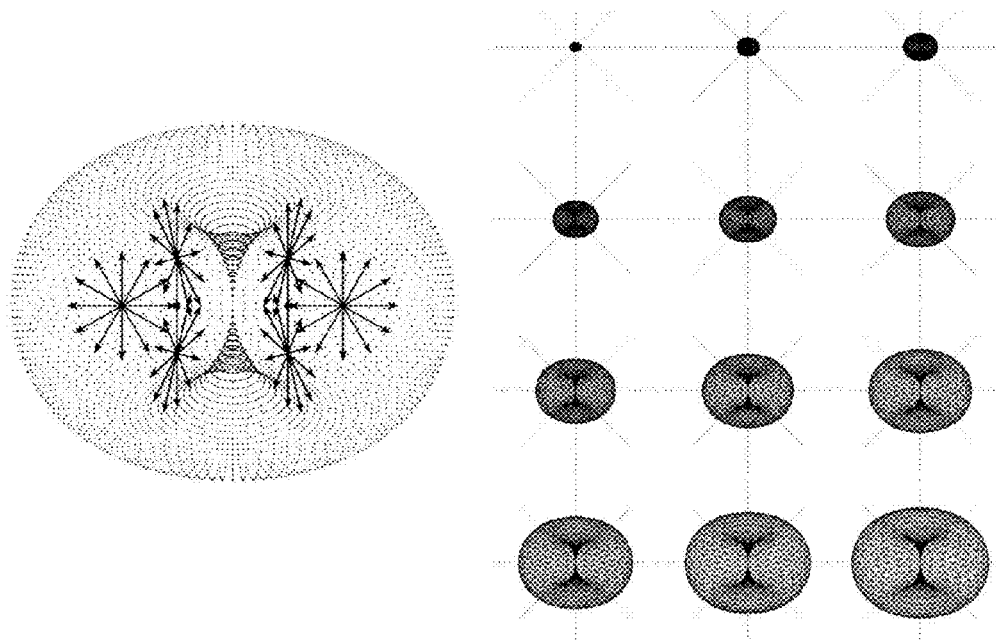
Figure 6B - Extension
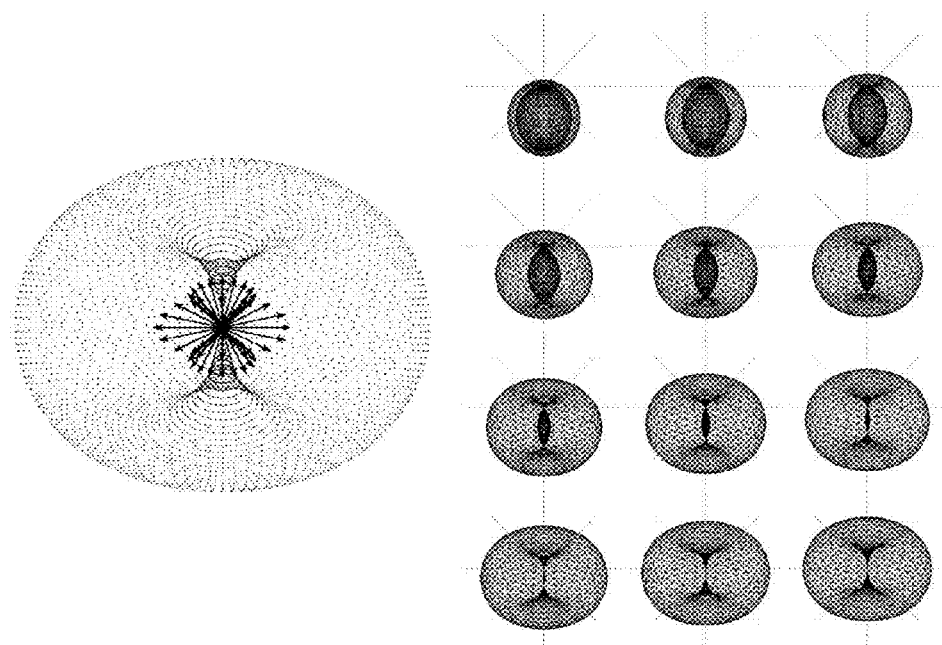
Figure 6C - Transposition

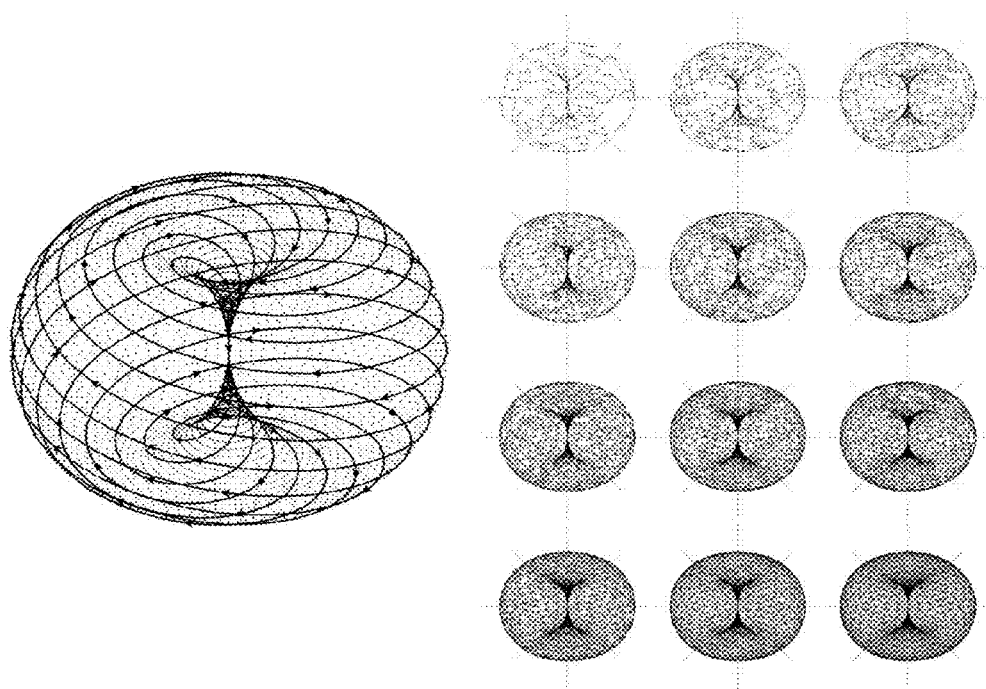
Figure 6D - Composition
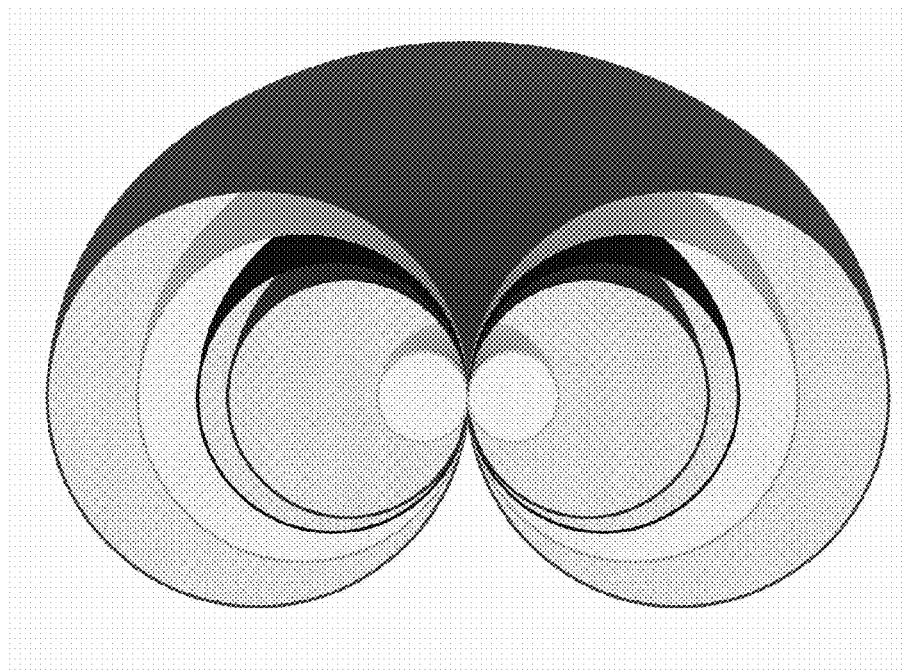
Figure 7

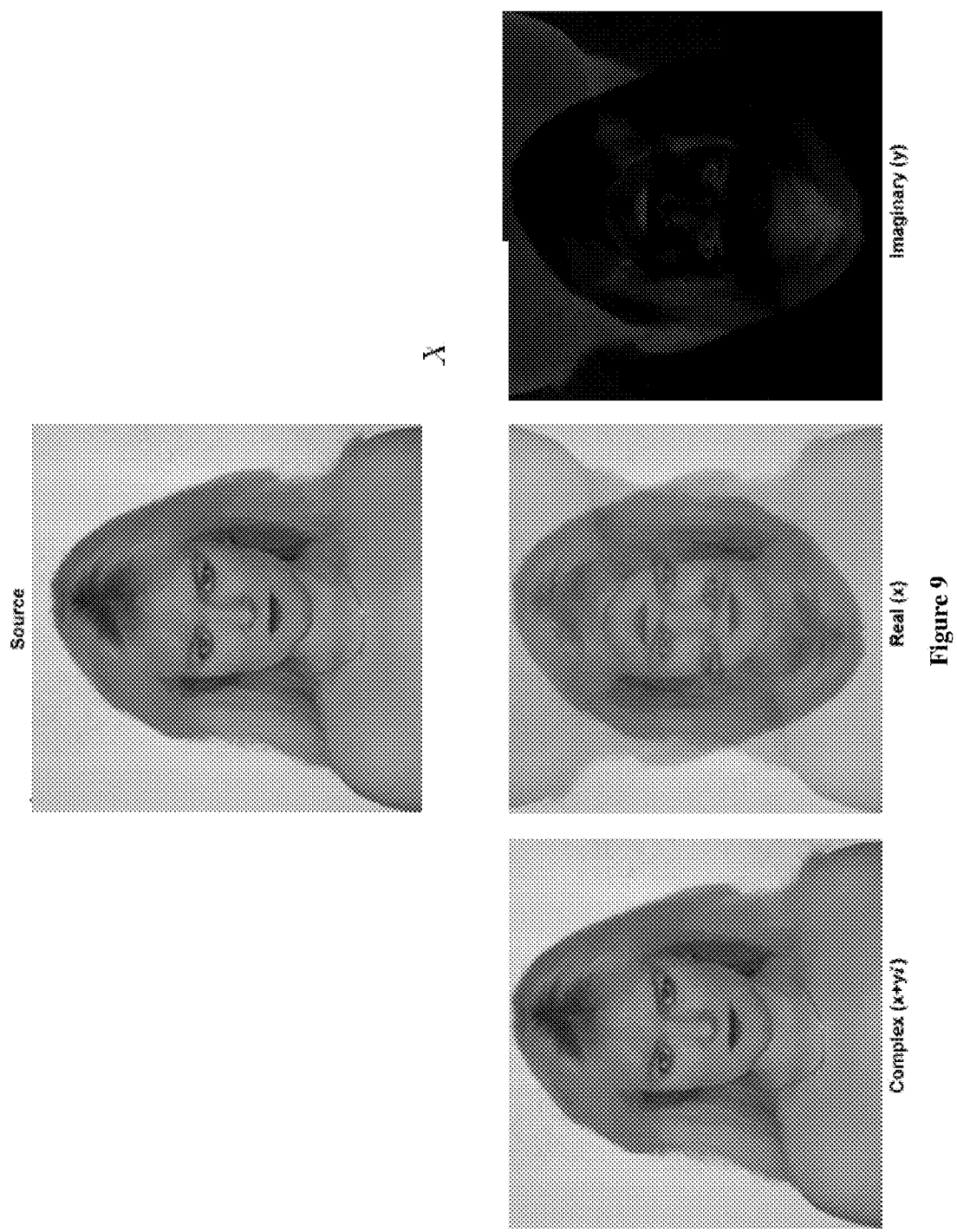

BI-PHASIC APPLICATIONS OF REAL AND IMAGINARY SEPARATION, AND REINTEGRATION IN THE TIME DOMAIN

This application claims priority to U.S. provisional application Ser. No. 61/735,932, filed Dec. 11, 2012. This and all other referenced extrinsic materials are incorporated herein by reference in their entirety. Where a definition or use of a term in a reference that is incorporated by reference is inconsistent or contrary to the definition of that term provided herein, the definition of that term provided herein is deemed to be controlling.

FIELD OF THE INVENTION

The field of the invention is use of mathematical transforms in rendering of information.

BACKGROUND

The following description includes information that may be useful in understanding the present invention. It is not an admission that any of the information provided herein is prior art or relevant to the presently claimed invention, or that any publication specifically or implicitly referenced is prior art.

Harmonic analysis involves the representation of functions or signals as superpositions of basic waves. Harmonic analysis has found application in a great many fields, including signal processing, quantum mechanics, and neuroscience.

Fourier analysis is a subset of harmonic analysis, in which signals are decomposed into real and imaginary components using a transform. The terms "transforms" and "transformation" are used herein to mean decomposition of a signal into a multiple components in the same or a different domain. For example, a Hilbert transform converts a function in one domain into a function in the same domain. In contrast, a Fourier Series or a Discrete-time Fourier transform (DTFT) transform a time series into a frequency spectrum. Transforms can be applied to time domains, spatial frequencies, and indeed to nearly any function domain. Various transforms are currently used for compression, filtering, frequency balancing, encryption, and for other purposes. Although transforms are usually mathematically based, transforms can also implemented in electronics, as for example, using a parallel pair of serially cascaded biquad filters.

Components produced by transformation can be processed separately, and synthesized (inverse-transformed) back together again. Transformed signals are not, however, always synthesized back to equivalent originals. MP3 compressed audio files, for example, contain only the real component of the original signal, not the imaginary component, and thus sustain significant loss in sound quality when being rendered to a listener. Additional losses can arise from the compression technology, resulting in sizzling, distortion, and flat, two dimensional sounds. Thus, there is a need to present such transformed audio files to a listener in a manner that is at least perceived to have a quality closer to that of the source of the original recording than a standard rendering.

In the case of video files, typical PEG compression applies a variant of a Fourier transformation (discrete cosine transform) to small square pieces of a digital image. The Fourier components of each square are rounded to lower arithmetic precision, and weak components are eliminated entirely, so that the remaining components can be stored very compactly. In normal image reconstruction, each image square is reassembled from the preserved approximate Fourier-transformed components, which are then synthesized to produce an approximation of the original image. Although rendering of a PEG-compressed file includes both components, current display technologies can cause blur and other distortions, due to inadequate pixel response time on LCD displays, resolution sampling methods, telecine processing by studios, and compression artifacts. These problems are especially pronounced with High Definition 4K and other large files. With the advent of LCD displays, motion blur has become even more of a problem due to sample-and-hold nature of the displays.

Several attempts have been made to resolve these distortions with respect to video files. ClearLCD™ and Clear Motion Rate™ technologies from Philips™ and Samsung™, for example, use a strobed backlight to reduce blurring. However, the existing solutions are limited to specific applications rather than being globally applicable. Thus, there is also a need to render compressed video files to a viewer in a manner that is at least perceived to have a quality closer to that of the source of the recording than a standard rendering.

With respect to biometrics, it is known to use brain waves to control physical or virtual objects, or to achieve a particular mental state, as for example a delta sleep state. Typically, this is accomplished by using the waves to trigger a beep, color on a display, movement of a mechanical arm, or other highly simplified indicia of a desired result. In so doing, a great deal of useful information about the subject's current psychology and cognition is eliminated. There is consequently a need to provide much more sophisticated feedback to a brain wave subject than is currently known.

Regardless of what type of signals are being processed (auditory, video, brain waves, etc) there is still a problem with the speed in which transforms and synthetic operations can be applied to complex signals, especially on a consumer device such as a laptop, tablet or cellphone. Presenting results to a listener, viewer, subject or other user even five, two, or one second after the signal is generated (or rendered from a data file) may be too slow to provide sufficient feedback to adequately manipulate the rendering in what appears to be a real-time fashion. Thus, there is a need for faster processing hardware and software to achieve the appearance of real-time operation and feedback.

SUMMARY OF THE INVENTION

The inventive subject matter herein provides apparatus, systems and methods in which a signal is decomposed into different components using a transform, with the components then being separately presented to a person in a manner that produces a different cognitive experience than would have resulted from either (a) presentation of the original signal, or (b) presentation of a fully synthesized (inverse transformed) signal.

Some embodiments of the inventive subject matter deal with audio signals. For example, the real and imaginary components of a decomposed monaural audio signal can be presented separately to a listener through headphones, so that the sound of one component is rendered in one ear, and the sound of the other component is rendered in the other ear. Given the out of phase nature of the two components, the listener's brain will try to integrate the sounds in a manner that has been found to produce a much richer experience than if the listener had heard (a) only one of the components, or (b) a signal resulting from a synthesis (reverse transform) of the real and imaginary components.

Where the source includes only one of the components, as in an MP3 file that only includes the real component, an electronic processor can generate a corresponding imaginary component from the real component, and then the two components can be rendered separately to the listener's left and right ears. Here again, real world testing demonstrates noticeable improvement in the cognitive experience of the listener.

Throughout the discussion herein, numerous references will be made regarding processors, servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

Aspects of the inventive subject matter can also be applied to video files or still images. In those instances separate viewing of the separate components can be accomplished with individual displays such as those on Google™ Glass™, or by employing glasses or contacts that filter the superimposed components differently for the left and right eyes.

In the case of biometric signals, components derived from transformation of the waves can be presented to the subject as separate sounds or images, and the subject producing the waves can learn to manipulate them using the component renderings as feedback. In some embodiments, a subject can manipulate his/her thoughts to effectively collapse or otherwise modulate an auditory or visual representation of a wave function corresponding to biometric signal. Where the biometric signal comprises brain waves, this can be useful as part of an analog neurocomputer. Other biometrics beside brainwaves can also be used to provide feedback, however, including for example represent breathing or heart rates.

It is still further contemplated that components derived from transformation can be rendered to a user other than through the ears or eyes. For example, the different components could be rendered to a user tactually, through skin vibrations applied to different sides of the body, or even different areas of the same side of the body, respectively. In other embodiments, the different components could be rendered to a user though electrical or thermal stimulation to the skin or deeper tissues. Here again the stimulation could apply the different components to different sides or areas of the body, respectively Additionally or alternatively to rendering the different components to different sides or areas of the body, it is contemplated that the different components could be rendered to the viewer in rapid sequence, e.g., a repeating sequence of the real component for $1/50^{th}$ of a second, followed by imaginary component for $1/50^{th}$ of a second. Most preferably the listener could control the time periods separately, along with duration of any resting periods. Such "flickering" could apply to auditory, visual, tactual, or any other renderings.

It is also contemplated that the different components could be mixed in various percentages, preferably in near real time by the user, through operation of software. In the case of an audio file, for example, the sound rendered to the left ear could be 100% real, 90% real and 10% imaginary, 80% real and 20% imaginary, etc., all the way to 100% imaginary. In interpreting these numbers it should be appreciated that the recitation of ranges herein is merely intended to serve as a shorthand method of referring individually to each separate value falling within the range. Thus, unless otherwise expressly indicated, each individual intervening value is incorporated into the specification as if it were individually recited herein. In addition, numeric values set forth herein should be construed in light of the number of reported significant digits, and by applying ordinary rounding techniques.

As used herein, the term "near real time" as applied to a transform process means that rendering of at least one of the components produced by the process will tend to lag no more than five seconds from input of the signal being processed, more preferably no more than two seconds from input of the signal being processed, and most preferably no more than one second from input of the signal being processed. Where an operator is manipulating mixing or other characteristics of rendered components, as for example in moving a control bar in an electronic interface, the term "near real time" means that rendering of at least one of the components lags no more than five seconds behind an operator-triggered manipulation, more preferably no more than two seconds behind an operator-triggered manipulation, and most preferably no more than one second behind an operator-triggered manipulation.

It is still further contemplated that the "different" cognitive experiences referred to herein are not necessarily desirable. Where the signal being processed is a breath, or background noise, for example, a listener might find the experience of renderings according to the inventive concepts herein to be better, worse, or substantially the same as the original sounds. In the case of a video or other image rendering, it may well be that separately presenting the different components could be very confusing or otherwise troubling to a viewer.

All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWINGS

FIG. 1 is a diagram of an embodiment in which harmonic analysis is used to process a monaural audio signal in a manner than can mimic a stereo listening experience.

FIG. 2 is a diagram of an embodiment in which two-channel audio signals are used to improve upon a traditional stereo listening experience.

FIG. 3 is a diagram of an embodiment in which an input source is used to feed both temporal and spectral reinforcement transforms.

FIG. 5C is a double torus torsion created according to teachings herein.

FIGS. 6A-6D are graphic representations of toroidal reformations created according to teachings herein.

FIG. 7 is a two-dimensional representation of a twelve-dimensional toroidal space based upon a person's breath.

FIG. 9 is a collection of images, showing source, complex, real and imaginary components.

DETAILED DESCRIPTION

Figure 4:
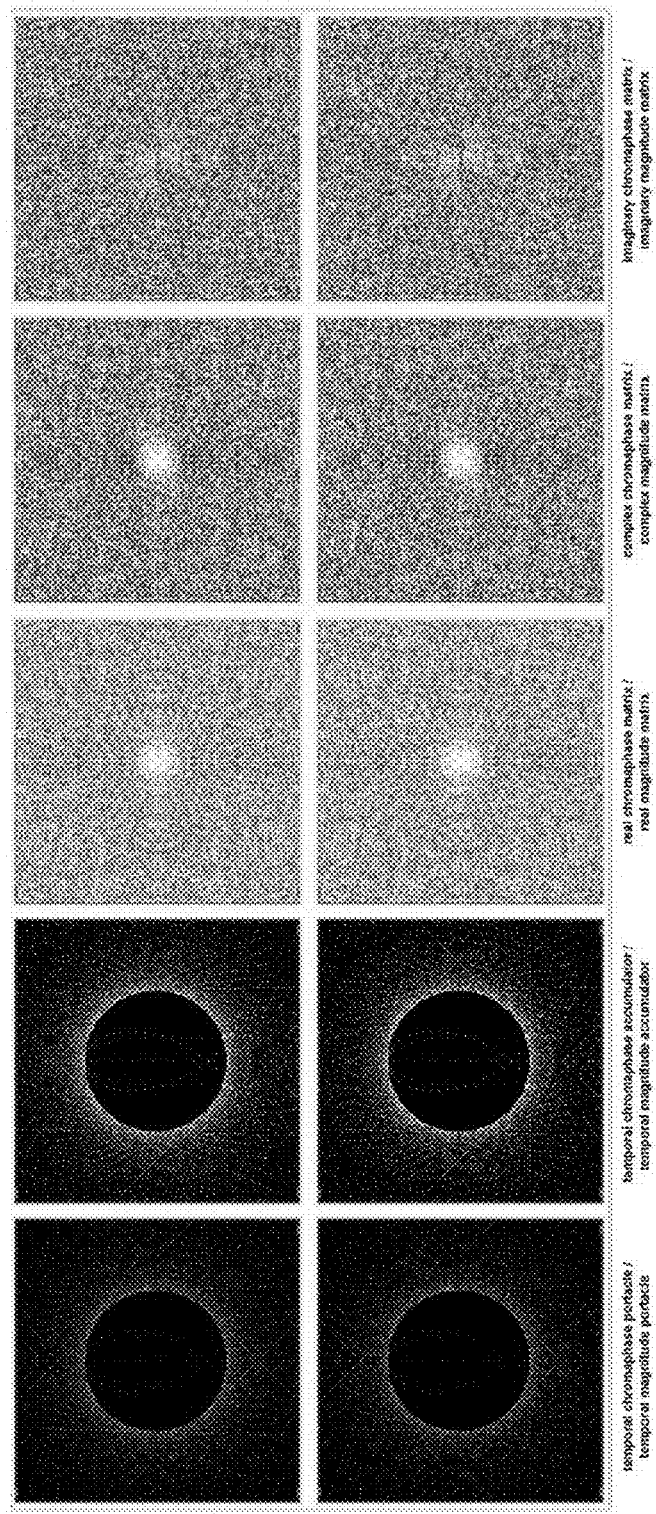
FIG. 4 is a collection of screen prints of various portacles.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

Transforming from a Single Input

FIG. 1 generally depicts an embodiment in which harmonic analysis is used to process a monaural signal in a manner than can mimic a stereo experience. Here, a microphone, camera, neuro-headband, or other monaural (single channel) input 10 is decomposed using a Fourier transform into real and imaginary components by computer processor 20 operating suitable software. The real component is rendered at a first interface 32, and the imaginary component is rendered at a second interface 34.

Where the interfaces 32, 34 comprise speakers, the speakers are preferably separated by a suitable distance from each other so that a listener 40 can spatially distinguish sounds emanating from interfaces 32 relative to sounds emanating from speaker 34. For example, speakers can be located in headphones, ear buds or otherwise placed adjacent the listener's ears, or could be placed at some distance from the listener, preferably arms length or farther. Speakers can also each independently include multiple diaphragms or other sound making apparatus, as for example a tweeter and a woofer.

Where the interfaces 32, 34 comprise visual displays, the displays are preferably located such that each eye sees only one of the interfaces. This can be accomplished using a device such as Google Glass™ that has two different display screens, but other options are also available. For example, a desktop, laptop, tablet or even cell phone display screen could separately render images of the first and second components, and a barrier could be used so that only the left eye of the viewer sees the image of the first component, and only the right eye of the viewer sees the image of the second component.

Optionally, computer processor 20 can be configured to mix the first and second (usually real and imaginary) components under control of the listener or other operator, so that for example, the sounds, images or other output from the first interface 32 might comprise 80% first component and 20% second component, perhaps 60% first component and 40% second component, or perhaps 90% first component minus 10% second component. Indeed all possible combinations of the two components are contemplated, including those that vary over time.

Also, interfaces 32, 34 could utilize different modalities. For example, interface 32 could be a speaker, and interface 34 could be a visual display, or perhaps a vibrating crystal.

Binaural Phasing

While not desiring to be limited to any particular theory or mode of operation, it is completed that the improved experience perceived by a listener using a system such as that shown in FIG. 1 is due to a principle known as binaural phasing. Previously known binaural beats occur when two simple frequencies of beats are presented separately but concurrently to a listener. For example, when listening with one ear to 100 Hz beats, and with the other ear to 107 Hz beats, the user perceives beats at a third frequency of 7 Hz. Of course that third, perceived frequency is simply the difference between the two actual frequencies. Somehow, the brain "hears" it.

Binaural phasing is different in that whereas both channels have the same frequencies, but those frequencies are in phase with each other. The brain is forced into resolving the differences of phase rather than frequency. One channel is carrying the real partials and the other is carrying the imaginary ones.

Transforming From a Multiple Inputs

FIG. 2 expands upon the concepts of FIG. 1 to situations where transforms are performed on more than one input. As representative of the general category of multiple inputs, FIG. 2 generally depicts an embodiment in which two-channel audio signals are used to improve upon a traditional stereo listening experience. The two-channel signals can be derived from any suitable source, including for example, left and right channels of a stereo player, a mixing board, or left and right microphones. Here, computer processor 20 is configured to decompose the signals from inputs 62, 64 into real and imaginary components, which produced left real and imaginary components, and right real and imaginary components.

It is contemplated that either of the output channels could contain any ratio of the signals among these four discreet streams. Thus, what is routed to speaker 32 could be some amount of the left real component minus some amount of the right imaginary component, and what is routed to speaker 34 could be some amount of the right real component minus some amount of the left imaginary component. The amounts referred to in this paragraph can range from some very small percentage such as 0.1% to 100%.

Where transforms are performed on multiple input channels, it is desirable but not essential that the same transform is used on the input of each of the channels. It is contemplated therefore in some embodiments to use a first transform on channel 1, a different transform on channel 2, and still another transform on channel 3. Outputs of those transforms can still be rendered to a user as separate sound streams, images, vibration patterns, etc, or additively or subtractively combined in any desired ratios.

Temporal Transform with Spectral Reinforcement

FIG. 3 expands upon the concepts of FIGS. 1 and 2 to situations in which an input source is used to feed both temporal and spectral reinforcement transforms. In this particular example, the resulting components are combined into a single stereo output pair (with a Temporal Mix control regulating the level of the temporal transform which is mixed into the output).

The temporal transform takes the input source, and synthesizes a full complement of frequency partials rotated 90 degrees out of phase from the source (i.e. the difference between real & imaginary). As with the spectral transform, the temporal routes the discreet real & imaginary results to the left & right outputs, respectively. Its function may be approximated by two pairs of two-pole, two-zero biquad filters in series as implemented by the following equation:

$$y[n]=a0*x[n]+a1*x[n-1]+a2*x[n-2]-b1*y[n-1]-b2*y[n-2]$$

using the following coefficients for a0, a1, a2, b1 & b2:

real (stage 1): 0.94657, -1.94632, 1.-1.94632, 0.94657 real (stage 2): 0.06338, .0.83714, 1. −0.83774, 0.06338

Imaginary (stage 1}: 0.0.260502, 0.02569, 1, 0.02569, -0.260502

Imaginary {stage 2}: 0.870686, −1.8685, 1, 1.8685, 0.870686

In this example, spectral reinforcement utilizes a variation of the spectral transform wherein individual real & Imaginary partial pairs are selectively attenuated or reinforced based upon their relationship to the whole. Three circular registers (buffers) are employed to hold the real, imaginary and feedback {attenuation} coefficients. The algorithm continuously monitors the magnitudes and phases of the real and imaginary pairs both (a) present at input and (b) within their accumulator loops using Cartesian to polar conversion. The partial of maximum amplitude within the present iteration triggers multiplication of an attenuation factor of 1/phi (i.e. the reciprocal of the Fibonacci constant) to that partial's feedback register entry. Conversely, the minimum phase of that iteration is mapped exponentially to the register indices, fully restoring the feedback register element corresponding to that phase to its maximum amplitude. During each period of iteration, the real & imaginary accumulators are multiplied by the updated feedback register to amplify or attenuate their contents accordingly.

Whereas real and imaginary coefficient are unique to the spectral domain, preferred embodiments maintain these as separate and discrete components after transformation back into the time domain. Magnitudes (r) and phases (θ) within the complex waveform can be calculated as shown in the following equations"

$$r=(x^2+y^2)^{1/2}$$

$$\theta = a\tan 2(y,x)$$

In a simple example, a microphone picks up the sounds of a user's breath or voice. The signal is processed in near real time, the noise removed, and the temporal signal split into real and imaginary components, and fed back to separate ears as described above. At the same time the spectral components of real and imaginary can fed back to separate ears sonically reinforcing those partials that are weak and need support to optimize the signal to its fullest potential.

Portacles

Real and imaginary components can be plotted visually using Cartesian or other coordinates. The resulting plots are referred to as "portacles" herein.

FIG. 4 generally depicts screen prints of various portacles. Column A depicts a temporal chromaphase portacle (top) and a temporal magnitude portacle (bottom). Column B depicts a temporal chromaphase accumulator (top) and a temporal magnitude accumulator (bottom). Column C depicts a real chromaphase matrix (top) and a real magnitude matrix (bottom). Column D depicts a complex chromaphase matrix (top) and a complex magnitude matrix (bottom). Column E depicts an imaginary chromaphase matrix (top) and an imaginary magnitude matrix (bottom).

Toroidal Representations

It is well known in science that blasting a crystal with a beam of x-rays reveals the quantum latticework created by positioning of the atoms inside the crystal. In an analogous manner, one can mathematically "shine" a beam of coherent white light through a portacle and then a lens, which reduces the image to a zero dimensional point. One can then mathematically place the point inside of a torus, which is then torsioned to populate all surfaces with the real and imaginary coefficients. Toroidal space (area of a torus) is a preferred surface topology to graphically and visually show a dynamic energy field.

Surprisingly, we have found that if the portacle was created using breath, brainwaves or other biometrics, the colors and patterns present on the surface of such a multi-dimensional torus can correspond more or less with intangible aspects of a person's personality. As of the filing of the current application, a 12 dimensional torus is thought to be optimal for that purpose.

Figure 5A:
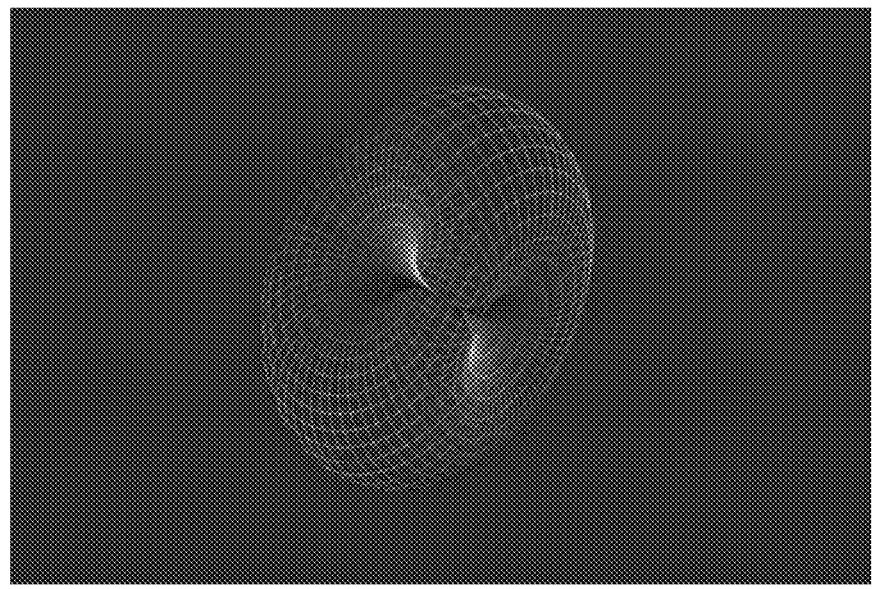
FIG. 5A is a single torus created according to teachings herein.
Figure 5B:
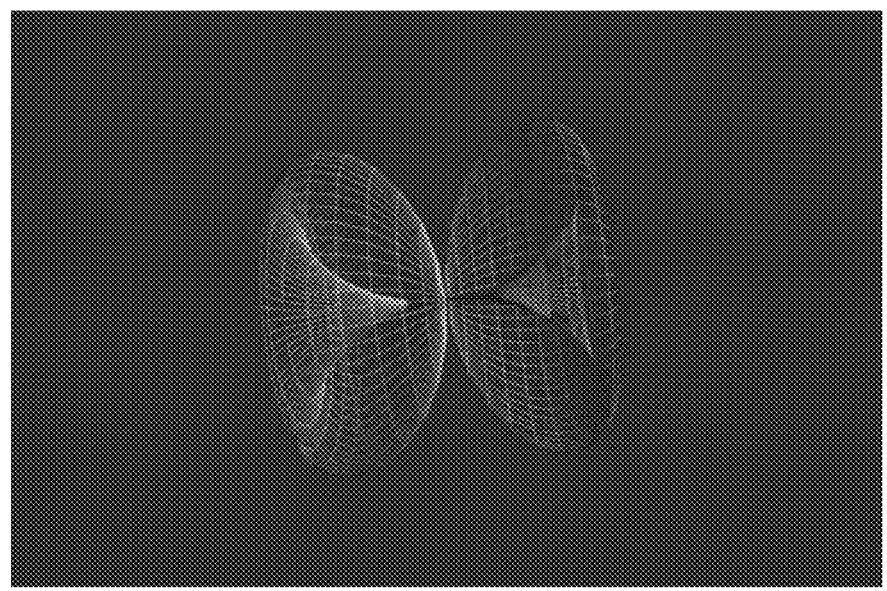
FIG. 5B is a double torus created according to teachings herein.

As noted above, components derived from transforms can be combined in myriad different ways. Such combinations can be visualized in various shapes and dimensions from a zero dimensional point to a line (1 dimension), circle (2 dimensions), sphere (3 dimensions) and torus (4 dimensions). Examples of toroidal representations of components produced by The Portacle™ software are shown in FIG. 5A (single torus), FIG. 5B (double torus) and FIG. 5C (double torus torsion).

A balanced real and imaginary dynamic flow represents as a torus. Under certain circumstances, however, the torus can undergo specific deformations. Below is a description of four of these deformations, which are collected in FIGS. 6A-6D. There are many more.

a. Composition refers to the completeness of connective vectors between the cells comprising the toroidal form. As composition decreases, gaps become evident in the interconnectedness of toroidal space.

b. Extension refers to the normalized (full) magnitude of the toroidal form. As extension decreases, the volume of the torus diminishes, thus limiting its inward and outward radiance.

c. Transposition refers to toroidal shifts in phase relative to its origin. As transposition increases, the volume of the toroidal form moves above or below its origin, ultimately developing a double vortex thread (one of which is situated at origin) as it passes through vesica piscis into nested spheres.

d. Convolution refers to the cross correlation of coordinates forming the toroidal manifold. As convolution increases, coordinates begin to wrap around in phase, progressively twisting the torus into the "knotted" form of a lemniscate.

Even taking as input a biometric as simple as a person's breath or speech can lead to useful information. FIG. 7 is a two-dimensional representation of a twelve-dimensional toroidal space based upon a person's breath. Each pixel represents one of the frequencies or partials. Its location is determined from the r:i (real:imaginary) coefficients, the color (omitted from the application) is the phase (or relationship between the peaks and valleys of the wave) and the brightness represents the volume, amplitude or magnitude of the partial.

It is contemplated that points, lines, circles, ellipses, squares and other geometries have specific meanings. Different attracting zones scattered around the toroidal surface are indicative of traps and distractions that arise due to the point, line, circle, toroidal and strange attractors. The toroidal space is thus a map of the internal structure and can be interpreted as revealing holes in the pattern.

Games and Entertainment

At the very least, providing a person with feedback based upon real or imaginary components of biometrics can provide entertainment, as for example where players try to manipulate the contours of the representations.

Figure 8A:
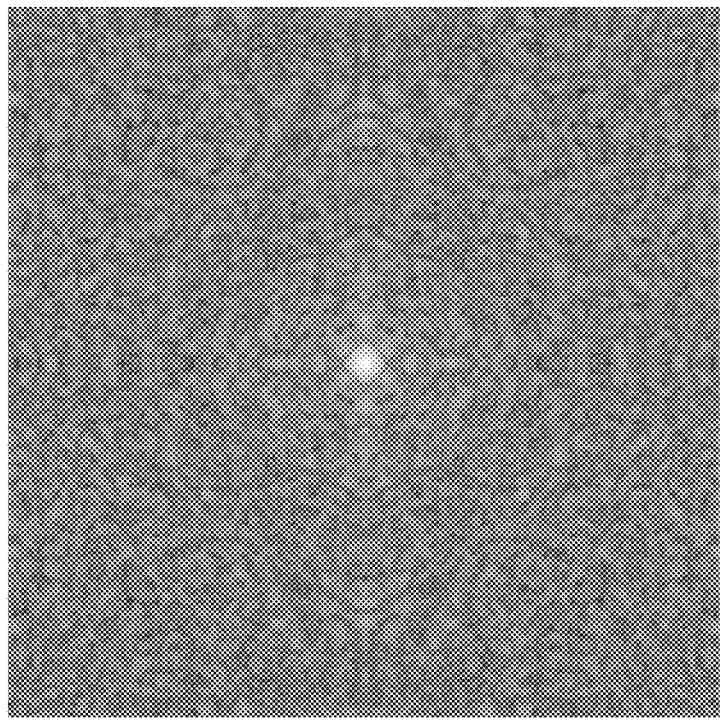
FIGS. 8a, 8b, and 8c are real and imaginary components of biometric waves mapped to x and y axes of a matrix, respectively
Figure 8B:
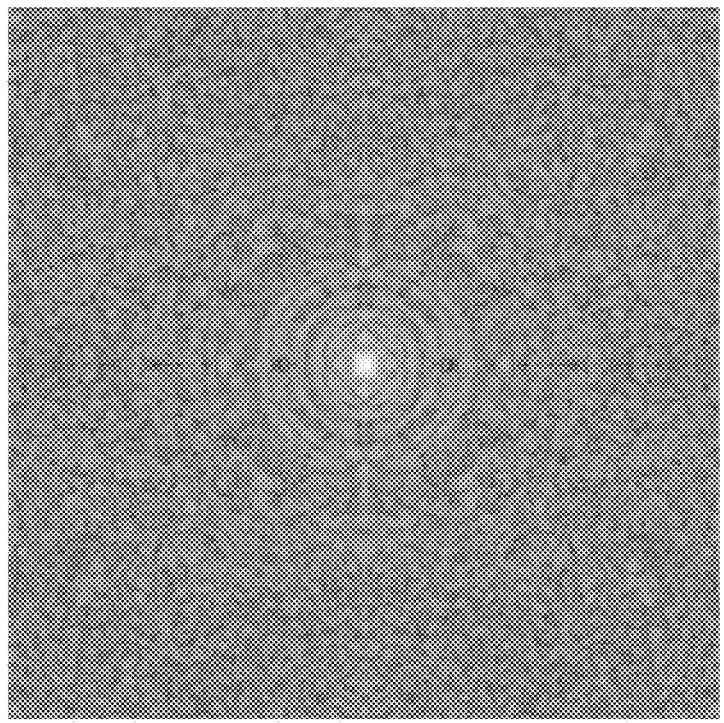
Figure 8C:
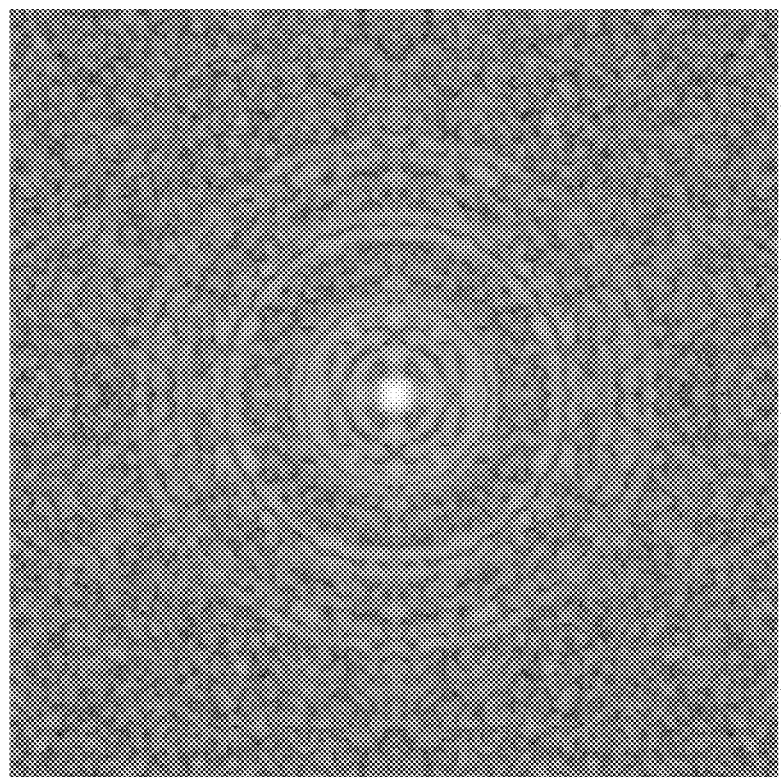

FIGS. 8a, 8b, and 8c are the real and imaginary components of biometric waves mapped to x and y axes of a matrix, respectively. According to a preferred interpretation, these matrices include banding regions that correlate to psychological and mental states/conditions. For example, FIG. 8a is thought to indicate a preponderance of imaginary partials (vertical ellipse) that are centered in the present moment (center axis), outward focus (outer band predominance). Along the same lines, FIG. 8b is thought to indicate an extrospective state (outer banding), preponderance of real components (horizontal ellipse) and grounding at the core level (inner-banding). Still further along the same lines, FIG. 8c is thought to indicate a balance between the real and imaginary components (circles instead of ellipses), lots of grounding in the core and self (central and middle bands).

Games and other forms of entertainment can readily be developed where players try to alter their thoughts, breath, and so forth to control the matrix. Guidance for such games could advantageously be based upon some or all of the following experimentally observed correlations:

Control Value: (SELF) AWARENESS
a. Complex Components {x+yi}: Introspection (i)/Extrospection (r)
b. +r/−i="looking" outward, extroversion, first attention
c. −r/+i="looking" inward, introversion, meditation
d. +r/+i=ultimate presence, force of perception, second attention
e. −r/−i="nirvana" or the imperturbable stillness of being Control Value: (CORE) ENERGETICS
a. Complex Components {x+yi}: Ktisis (i)/Energes (r)
b. +r/−i—["body" in action, work, effort, expending energy]
c. −r/+i—[conflict, polarity, differential advancement]
d. +r/+i—[active pursuit, dedicated support, involvement]
e. −r/−i—Allasso (transformation), ["body" at rest]

Control Value: (MANIFOLD) INTEGRATION
a. Complex Components {x+yi}: Singularity (i)/Connectivity (r)
b. +r/−i—manifold focus, [togetherness]
c. −r/+i—individual focus, [aloneness/isolation]
d. +r/+i—[fundamental interconnectedness with all things]
e. −r/−i—[bilateral disconnection], [therapeutic/positive] "undoing"

Control Value: (TEMPORAL) ORIENTATION
a. Complex Components {x+yi}: Past (i)/Future (r)
b. +r/−i—[coming from/looking toward future]
c. −r/+i—[coming from/looking toward past]
d. +r/+i—[rooted in present but formulating from past and future, "temporal convergence"]
e. −r/−i—[rooted wholly in present, eliminating personal history]

It is also contemplated that one or more physical controls (i.e. the keyboard, a joystick or such) be used in tandem with psiometric information derived from the biometrics. Among other things, the physical controls could optimally be used in tandem with the psiometric controls, the progression of game play being governed by a floating balance between the two.

Image as Series of Waveforms

Any n-dimensional array can be expressed as a series of waveforms. In the case of a photograph or other 2d array, each horizontal row and vertical column of pixels forms a wave wherein pixel luminance corresponds to waveform sample amplitude. In the top image of FIG. 9, for example, the 256 rows and 256 columns would comprise a series of 512 waveforms. Applying a transform to those waveforms one can derive a complex (x+yi) image (bottom left), which matches the original, a real component image (bottom middle) and an imaginary component image (bottom right).

Figure 10:
FIG. 10 is a screen shot of the source image of FIG. 9, enhanced by a visual representation of a mental state.

One can also combine video or still images with visual representations of real or imaginary components arising from breathing, heart rate, brain waves or other biometrics. An example is show in FIG. 10.

Analog NeuroComputer

It is contemplated that a person's brain (and possibly other living organisms) can be used as an analog computer, with their body being used as an antennae in order to connect to the collective entangled mind of the planet. This concept is supported by the research of Dean Radin of the Noetic Society (IONS) and others regarding random number generators and their relationship to the collective mind and their belief that this is evidence of such. This research was recently reported in a book called *Entangled Minds: Extrasensory Experiences in a Quantum Reality* by Dean Radin.

Regardless of the merits of that concept, the co-inventors of this application have designed and built a device called the human neurocomputer.

The neural interface hardware comprises two sensors, which are typically placed to either side equidistant to the center of the forehead, and a ground, which rests over the ear (although alternative configurations may be used depending upon the observing organism). The two sensors pick up the raw neurological and/(or) bioelectric signals emanating from the observer and send them to processing equipment at a sampling rate of 500 Hz (along with supplementary signal analysis data processed by the interface). Although sampling is at 500 Hz with the current technology, additional sample rates are contemplated, including faster rates that may become available in the future depending on the bioenergetic interface technology used.

Preferred processing equipment comprises The Portacle™ Human Neurocomputer™ which is a proprietary software program which is currently operable on a general purpose Apple™ computer. Operation on other computers is also contemplated. The raw data is routed to the neurocomputing algorithm within The Portacle, wherein its components of DC & GD (great diesis) through 250 Hz (B# below middle-C) are separated into real & imaginary streams using the temporal transform. Although all of the data can be used in computation, in preferred embodiments the user can select how much of the input signal becomes integrated into the portacles, matrices and spectral reinforcement using a Neural Mix control. With the right combination of settings, The Portacle can be run on bioelectric signals alone.

When analog processing is required by The Portacle, a matched-mode signal encompassing a continuous range of all possible outcomes is sent to the observer as generated by the adaptive stochastic oscillator; the components of which may be apprehended as visual, auditory and vibrational stimuli, as well as sensitivity modulation (i.e. how much "attention" the neurocomputing algorithm is "paying" to the observer).

This feedback loop continues until wave function collapse occurs. This takes advantage of a quantum mind-body problem, wherein an observer subject to a state vector encompassing multiple simultaneous possibilities will reduce these to a singular outcome consistent with their need for resolution in observational conflict. It is this "spark of ktisis" that can assist in yielding an answer to whatever question is being posed.

Games and other forms of entertainment are also contemplated with respect to the Neurocomputer. For example, one can transpose the sound signal coming from ones brain via the Neurocomputer up five octaves into the piano range. The resulting melodies are extremely intriguing and at the very least highly entertaining. Other transposition coefficients could also be used that maintain the harmonic series integrity of the source. Thus, five octaves is just and example, and one could also perform other transpositions, including for example, four octaves, four octaves and a major fifth, etc. Thus, any harmonic transposition interval can be employed in the process.

Adaptive Stochastic Oscillator

The Adaptive Stochastic Oscillator can be used as a stand-alone tool for transmitting highly targeted subsonic deterministic frequencies with frequency, phase and magnitude precision, as well as stochastic elements, to the human body.

Two different sciences support this technology. The first is one called Whole Body Vibration that deals with a device that one stands on to receive very low frequency vibrations that are applied to the entire body. The body oscillates up and down at specific frequencies that have been shown to have determinable results and that can target highly specific parts of the human body and mind. There are lists of these helpful frequencies that are well known and accepted by those in the field.

The second support comes from documented and declassified research that US Army undertook during the 60's regarding the effect of low frequencies on soldiers under transit across rough water, land or air in different types of vehicles. This research pointed out specific frequencies that have harmful effects to humans.

Combined together, these two provide a list of frequencies that can be fed back to a person to assist them in a number of different ways physically, mentally, emotionally and perhaps spiritually. Our ASO (adaptive stochastic oscillator) can be utilized as a high definition frequency generator, which can produce a subsonic frequency that is then applied to the human body via a proprietary transducer and amplifier capable of producing such a low frequency. This would be a new more sophisticated method of whole body vibration.

Sensory Resonance

Figure 11:
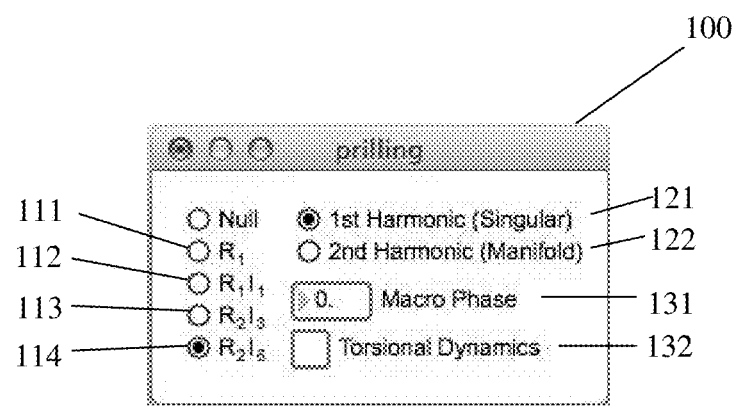
FIG. 11 is a screen print of an interface 100 of an instance of The Portacle™

Sensory resonance is described in the book *Harmonic Law: The Science of Vibration* by one of the co-inventors herein, Don Estes. The goal is to synchronize the visual, auditory and kinesthetic sensory mechanisms into one coherent experience, bringing about a state of profound relaxation and intense inspiration at the same time. FIG. 11 is a chart that summarizes the theory of Sensory Resonance.

In contrast to the book's use of NLP (Neuro-Linguistic Programming) to seek sensory resonance, it is contemplated herein that one could use representations of the real and imaginary components derived from transforming biometric waves. In especially preferred embodiments, such representations can be delivered by multi-sensory platforms that allow the individual to see, hear and/or feel the collective feedback of many cells in the body at the same time.

Software Interface

FIG. 11 generally depicts a screen print of an interface 100 of an instance of The Portacle™, through which a user can select and modify different display views (prilling). Radio buttons along the left 111-114 are used to select combinations of real or imaginary components for prilling. The first radio button 121 on the right selects the $1^{st}$ harmonic, which is in a particular instance the single torus of FIG. 5A. The second radio button 122 selects the $2^{nd}$ harmonic, which turns the single torus of FIG. 5A into the double torus of FIG. 5B. Field 131 accepts a numeric input for phase differential, and field 132 accepts numeric input for ratio of torsion to rotation. The interface 100 should be interpreted as being driven by any suitable device, including a laptop, cell phone, tablet, phablet, etc, and using any suitable operating system. Of particular interest is an iPhone™ or other device running a version of iOS™

By way of example, the following are prilling equations for Toroidal Spaces $$\text{space}=\text{matrix}(x,y,z)$$

wherein . . . dimensional flags [optional]:

$d1$=1st dimensional flag (0 to 1)

$d2$=2nd dimensional flag (0 to 1)

$d3$=3rd dimensional flag (0 to 1)

$d4$=4th dimensional flag (0 to 1)

variables:

$h$=harmonic (1 to . . . )

$p$=phase (0 to $2pi$)

$t$=torsion (0 to $-2pi$)

$u$=outer loop ($-pi$ to $pi$)

$v$=inner loop ($-pi$ to $pi$)

toroidal space:$w=\sin(p+h*v+t)$ . . . .

[or substitute 1d input vector flow for prill]

$$x=\cos(v+t)*w$$

$$y=\sin(v+t)*\cos(u-(t*2))*w$$

$$z=\sin(v+t)*\sin(u-(t*2))*w \text{ with dimensional flags:}$$

$$w=\sin(p+h*v+t)*d4+(1-d4)$$

[or substitute (1d input vector flow)*d4+(1−d4) for prill]

$$x=(\cos(v+t)*d1+(1-d1))*w$$

$$y=((\sin(v+t)*d2+(1-d2))*(\cos(u-(t*2))*d3+(1-d3))\\ *w*d2)$$

$$z=((\sin(v+t)*d3+(1-d3))*(\sin(u-(t*2))*d3+(1-d3))\\ *w*d3).$$

Filtering of Noise from a Signal

It is possible to improve the accuracy of frequency analysis by matching the sampling rate to the unit of measurement. Since frequency is measured in Hertz or (cycles per second) and the standard unit of measurement is 1 cycle per one second in the first octave, the sampling rate should reduce to the number one at the first octave. However, this is rarely the case with modern analysis because this connection between sampling rate and unit of measurement is not known in science. The standard measurement utilizes a 32, 64, 128 or 256K sampling rate, which when reduced to the first octave results in 0.9765625 Hz., not 1.0. This means that standard measurements are off by 768 Hz. in the 15th octave. This ratio is 125:128, the reciprocal of which is known in music theory as the great diesis.

The first harmonic law states that all harmonically related frequencies must be whole number ratios of each other. It thus turns out that that the noise inherent within any signal can be removed by deleting any real or imaginary partial that is not a whole number ratio of the fundamental frequency.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A method of presenting information to a user, the method comprising:
   applying a mathematical transform to a waveform to produce independently manipulable real and imaginary components; and
   separately presenting to different parts of the user's body, first and second renderings of first and second streams that have unequal representations of the real and imaginary components, respectively, such that the first and second renderings are perceptively distinguishable by the user at least spatially or temporally.

2. The method of claim 1, further comprising deriving the waveform from a digital representation of an image.

3. The method of claim 1, further comprising deriving the waveform from a digital representation of a sound.

4. The method of claim 1, further comprising deriving the waveform from a digital representation of a brain wave.

5. The method of claim 1, wherein the waveform comprises a discretely and finitely sampled signal.

6. The method of claim 5, wherein the waveform comprises a compressed media file.

7. The method of claim 1, wherein the waveform comprises a time domain signal, and the step of applying the transform produces a spectral domain signal.

8. The method of claim 1, further comprising presenting the first rendering to the first sense area but not the second sense area, and presenting the second rendering to the second sense area but not the first sense area.

9. The method of claim 1, wherein the transform is selected from the list consisting of a Hilbert transform, a Cochlea transform, a Hadamard transform, a Walsh transform, a Haar transform, and a wavelet transform.

10. The method of claim 1, wherein the transform results from operation of first and second parallel, serially cascaded biquad filters.

11. The method of claim 1, further comprising effecting the steps of applying the transform and presenting the first and second streams in real time.

12. The method of claim 1, further comprising providing an interface through which the user can alter relative amounts of the first and second components in the first stream (e.g., portacle).

13. The method of claim 12, wherein the interface allows the user to alter relative amounts of the first and second components in the second stream.

14. The method of claim 12, wherein the interface allows the user to subtract at least a portion of the second component from at least a portion of the first component in deriving the first stream.

15. The method of claim 12, wherein ratios between representations of the first and second components in the first stream are modulated by a time-varying modulation source.

16. The method of claim 1, further comprising providing an interface through which the user can visualize a graphic representation of at least one of (a) the first and second components and (b) the first and second streams.

17. The method of claim 16, wherein the graphic representation comprises a torus.

18. The method of claim 16, wherein the graphic representation comprises a deformed torus, wherein the deformation is selected from the group consisting of a composition, an extension, a transposition and a convolution.

19. The method of claim 16, wherein the waveform is derived from an image, and the graphic representation comprises a composite of at least a portion of the image and a representation of at least one of the first and second streams.

20. The method of claim 1, further comprising providing an interface through which the user can visualize a graphic representation of a correlation of a psychological status of at least one of (a) the first and second components and (b) the first and second streams.

21. The method of claim 20, wherein the psychological status of the user is selected from the list consisting of awareness, core energetics, integration, and time.

22. The method of claim 1, further comprising deriving the waveform from first and second sensors coupled to the forehead of the user.

23. The method of claim 1, further comprising establishing a feedback loop between (a) the waveform sensed by the sensor and (b) an input to the user derived from the first and second streams.

24. The method of claim 23, further comprising training the user to consciously manipulate the waveform to produce a desired effect on the input.

25. The method of claim 23, wherein the desired effect is collapse of a wave function corresponding to the waveform.

26. The method of claim 23, further comprising using the feedback loop as part of an analog neurocomputer.

27. A system for presenting data to a user, wherein at least a portion of the data can be reduced to a waveform, comprising:
   an analyzer configured to apply a mathematical transform to the waveform to produce at least first and second independently manipulable, out of phase components;
   a mixer configured to produce first and second streams having unequal representations of the first and second components, respectively; and
   wherein the system is configured to separately provide the first and second streams to different sides of the user's body user in real time, such that the first and second streams are perceptively distinguishable by the user at least spatially or temporally.

28. The system of claim 27, further comprising presenting the first stream to the first sense area but not the second sense area, and presenting the second stream to 29. The system of claim 27, wherein the transform is selected from the list consisting of a Cochlea transform, a Hadamard transform, a Walsh transform, a Haar transform, a wavelet transform.

30. The system of claim 27, wherein the first and second independently manipulable components comprise real and imaginary portions, respectively.

31. The system of claim 27, further comprising a math chip dedicated to performing the transform.

32. The system of claim 27, wherein the analyzer and the mixer are implemented on a device having a telephony capability.

33. The system of claim 27, wherein the analyzer and the mixer are implemented on a portable device having a display through which the user can operate an interface to alter relative amounts of the first and second components in the first stream.

34. The system of claim 33, wherein the interface allows the user to alter relative amounts of the first and second components in the second stream.

35. The system of claim 33, wherein the interface allows the user to subtract at least a portion of the second component from at least a portion of the first component in deriving the first stream.

36. The system of claim 27, further comprising a sensor that detects a time varying biometric used to construct the waveform.

37. The system of claim 27, further comprising at least first and second effectors configured to present the first and second streams, respectively, to perceptively different sense areas of the user.

* * * * *